(12) United States Patent
Sakai et al.

(10) Patent No.: US 8,743,272 B2
(45) Date of Patent: Jun. 3, 2014

(54) IMAGE PROCESSING APPARATUS AND METHOD OF CONTROLLING THE APPARATUS AND PROGRAM THEREOF

(75) Inventors: Hiroyuki Sakai, Chigasaki (JP); Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 739 days.

(21) Appl. No.: 12/769,412

(22) Filed: Apr. 28, 2010

(65) Prior Publication Data

US 2010/0295998 A1 Nov. 25, 2010

(30) Foreign Application Priority Data

May 21, 2009 (JP) .................................. 2009-123543

(51) Int. Cl.
*H04N 9/73* (2006.01)
*H04N 5/235* (2006.01)

(52) U.S. Cl.
USPC ........................................ 348/362; 348/223.1

(58) Field of Classification Search
USPC .................... 348/222.1, 223.1, 234
See application file for complete search history.

(56) References Cited

U.S. PATENT DOCUMENTS

| 7,010,160 | B1 | 3/2006 | Yoshida | |
|---|---|---|---|---|
| 8,081,238 | B2 * | 12/2011 | Ono | 348/234 |
| 2005/0036709 | A1 * | 2/2005 | Imai | 382/286 |
| 2009/0021596 | A1 * | 1/2009 | Izume et al. | 348/222.1 |
| 2009/0034838 | A1 | 2/2009 | Umeda et al. | |
| 2009/0185055 | A1 * | 7/2009 | Ono | 348/234 |

FOREIGN PATENT DOCUMENTS

| JP | 7-271913 | 10/1995 |
|---|---|---|
| JP | 7-271913 A | 10/1995 |
| JP | 2006-324987 | 11/2006 |
| JP | 2007-122321 A | 5/2007 |
| JP | 2007-228221 | 9/2007 |
| JP | 4-057147 | 3/2008 |

\* cited by examiner

*Primary Examiner* — Timothy J Henn
(74) *Attorney, Agent, or Firm* — Fitzpatrick, Cella, Harper & Scinto

(57) ABSTRACT

A feature amount is calculated from input image data, then a scene of the input image data is determined based on the feature amount and the reliability of the scene is calculated. Then correction processing is performed on the input image data that corresponds to the determined scene and the scene reliability of the scene.

18 Claims, 10 Drawing Sheets

IMAGE PROCESSING APPARATUS AND METHOD OF CONTROLLING THE APPARATUS AND PROGRAM THEREOF

BACKGROUND OF THE INVENTION

1. Field of the Invention

The present invention relates to an image processing apparatus and its control method to correct image data in correspondence with the feature of the image data.

2. Description of the Related Art

In recent years, a digital camera which records a captured still image obtained with an image sensor as digital data is widely used. Further, in accordance with broad use of a large capacity memory card to record images, storage of a large number of photographed images is a general application. Since a large number of images can be obtained and stored easily, an increasing number of images are photographed and stored without careful consideration and with inappropriate exposure value. For example, in an image photographed in underexposure status, the entire stored image is dark although photographing has been made for a bright spot. Upon the display of such an image obtained in underexposure status on a computer screen, or upon print-output of such image for inspection, it is desirable to perform the appropriate correction processing to compensate over/underexposure upon photographing on the photographed image. As it is very troublesome to manually perform the correction processing on a large number of images separately, it is desirable to automatically determine over/underexposure status of each photographed image and perform correction processing. However, it is difficult to automatically determine, for example, a nightscape image, which is entirely dark, and an underexposure image. To solve this problem, a method for automatically determining a nightscape image and an underexposure image and performing appropriate correction processing is proposed.

Literature 1 (Japanese Patent Laid-Open No. 2007-228221) discloses a method for determining a photographed scene and re-correcting correction processing conditions, set based on the scene determination, in correspondence with nightscape index. The night view index in this Literature 1 is calculated by using photographing conditions upon photographing, skin color pixel information of the image, and average luminance of the entire image. In the method disclosed in the Literature 1, the correction condition is automatically set by determining the image photographing scene of the photographed image. Further, by addition of correction in consideration of night view photographing, a more appropriately-corrected image can be obtained. However, upon determination of photographing scene, if the photographing conditions upon photographing are not set or set conditions have been replaced with other conditions, the scene determination is insufficient.

Further, Literature 2 (Japanese Patent No. 04057147) discloses a backlight scene determination method for determination of a backlight scene without erroneous determination even when a dark area other than a main subject exists. In the method disclosed in the Literature 2, it is not determined whether or not the image is a landscape image in an underexposure status where the brightness is low or a nightscape image. For example, if the background is dark and a part of the image is irradiated with bright light in a nightscape image, the irradiated part is determined as a non-backlighted subject. Further, if the brightness and saturation distribution are low in a dark area, the image is determined as a backlighted image and the dark area in the nightscape image is determined as a backlighted part. In this determination of the dark area of nightscape as a backlighted part, the dark area of the nightscape image is corrected to a brighter area.

Further, Literature 3 (Japanese Patent Laid-Open No. 2006-324987) discloses a method of dividing a photographed image into plural sections, calculating section feature quantities as quantities of divided image sections, calculating the accuracy of photographic scene assigned to the photographed image from the section feature quantity, and determining the degree of correction with respect to the photographed image from the calculated accuracy of the photographic scene. In the Literature 3, as a method for calculating the accuracy of photographic scene, a luminance difference between a section group positioned in the central area of the photographed image and a section group positioned in a peripheral area is used in for example determination of backlighted and frontlighted image. That is, if the luminance of the section group in the central area is lower than that of the section group in the peripheral area, the scene is determined as a backlighted scene. On the other hand, if the luminance of the section group in the central area is higher than that of the section group in the peripheral area, the scene is determined as a frontlighted scene. At this time, the accuracy of backlighted/frontlighted scene is calculated based on the above-described luminance difference, in consideration of spot light as a photographic scene which is regarded as extreme front light scene. However, in the Literature 3, as the scene accuracy is determined with reference to only the feature quantity analyzed from the image, the scene accuracies of various images cannot be obtained. For example, upon photographing of nightscape, if a central area is dark as a nightscape while a peripheral portion is neon-lighted and bright, the luminance of the central area is higher than that of the peripheral area and the scene is determined as a backlighted scene. Further, in a nightscape image and a backlighted image, if the difference between the luminance of the central area and that of the peripheral area in each image is the same, the same scene accuracy is calculated, and the discrimination between nightscape image and backlighted image cannot be made.

SUMMARY OF THE INVENTION

An aspect of the present invention is to eliminate the above-mentioned problems with the conventional technology.

The feature of the present invention resides in scene determination of image data and image correction in accordance with determined scene.

According to an aspect of the present invention, there is provided an image processing apparatus comprising: a feature amount calculation unit that calculates a feature amount from input image data; a scene determination unit that determines a scene of the input image data based on the feature amount; a first calculation unit that calculates a first scene reliability of the scene determined by the scene determination unit based on the feature amount, a feature amount of a representative point of the scene determined by the scene determination unit, and a weight of the representative point; and a correction unit that performs correction processing on the input image data, in correspondence with the scene determined by the scene determination unit and the first scene reliability calculated by the first calculation unit.

According to another aspect of the present invention, there is provided a control method for controlling an image processing apparatus, comprising: a feature amount calculation step of calculating a feature amount from input image data; a scene determination step of determining a scene of the input image data based on the feature amount; a first calculation step of calculating first scene reliability of the scene determined in the scene determination step based on the feature amount, a feature amount of a representative point of the scene determined in the scene determination step, and a weight of the representative point; and a correction processing step of performing correction processing on the input image data, in correspondence with the scene determined in the scene determination step and the first scene reliability calculated in the first calculation step.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereinbelow, an embodiment of the present invention will now be described hereinafter in detail, with reference to the accompanying drawings. It is to be understood that the following embodiment is not intended to limit the claims of the present invention, and that not all of the combinations of the aspects that are described according to the following embodiment is necessarily required with respect to the means to solve the problems according to the present invention.

In the present embodiment, an image processing system having an image processing apparatus to analyze digital image data and determine a scene will be described.

Figure 2:
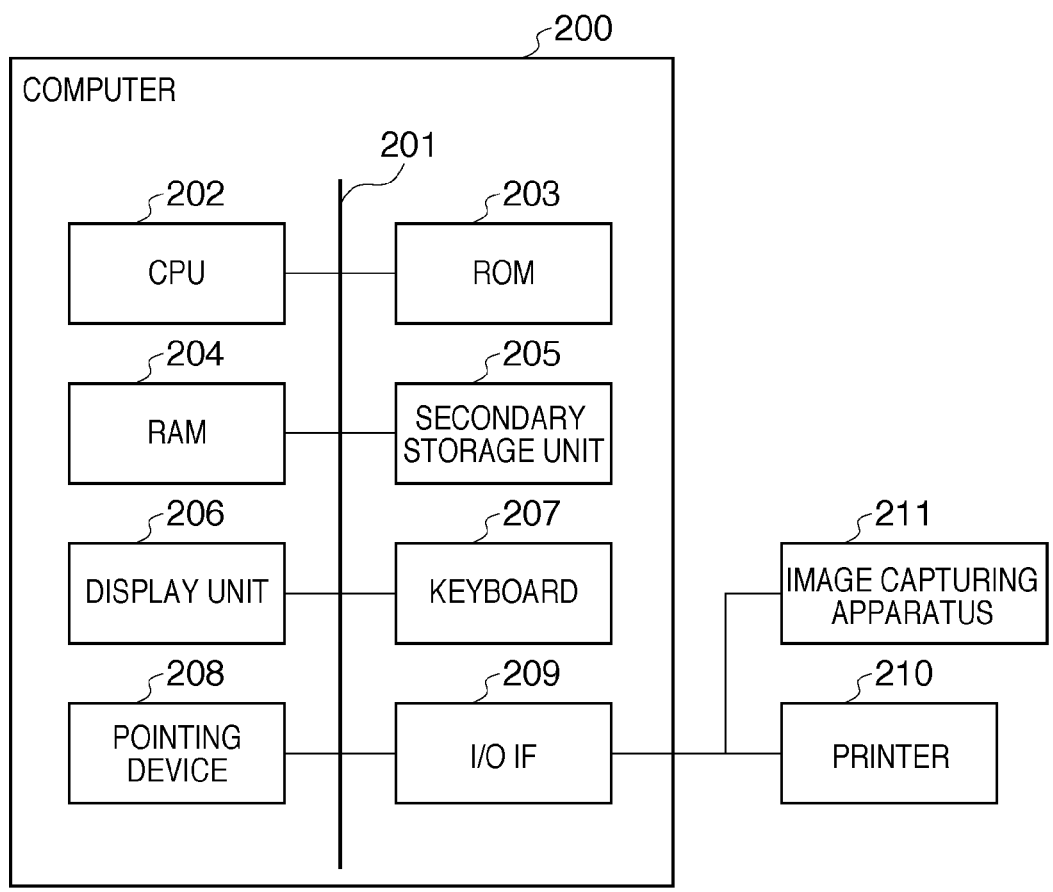
FIG. 2 is a block diagram showing a configuration of the image processing system according to the embodiment.

FIG. 2 is a block diagram showing a configuration of the image processing system according to the embodiment of the present invention.

The image processing system has a computer 200, a printer 210 connected to the computer 200, and an image capturing apparatus 211 (for example, a digital camera or a scanner). In the computer 200, a CPU 202, a ROM 203, a RAM 204 and a secondary storage unit 205 such as a hard disk are connected to a system bus 201. Further, as a user interface, a display unit 206, a keyboard 207, and a pointing device 208 are connected to the CPU 202 or the like. Further, the printer 210 is connected via an I/O interface 209. Further, the image capturing apparatus 211 for image data input is connected via the I/O interface 209. When execution of an application (having a function to perform the following processing) is instructed, the CPU 202 reads a corresponding program installed in the secondary storage unit 205 and loads the program to the RAM 204. Thereafter, by starting the program, the processing is performed.

Figure 1:
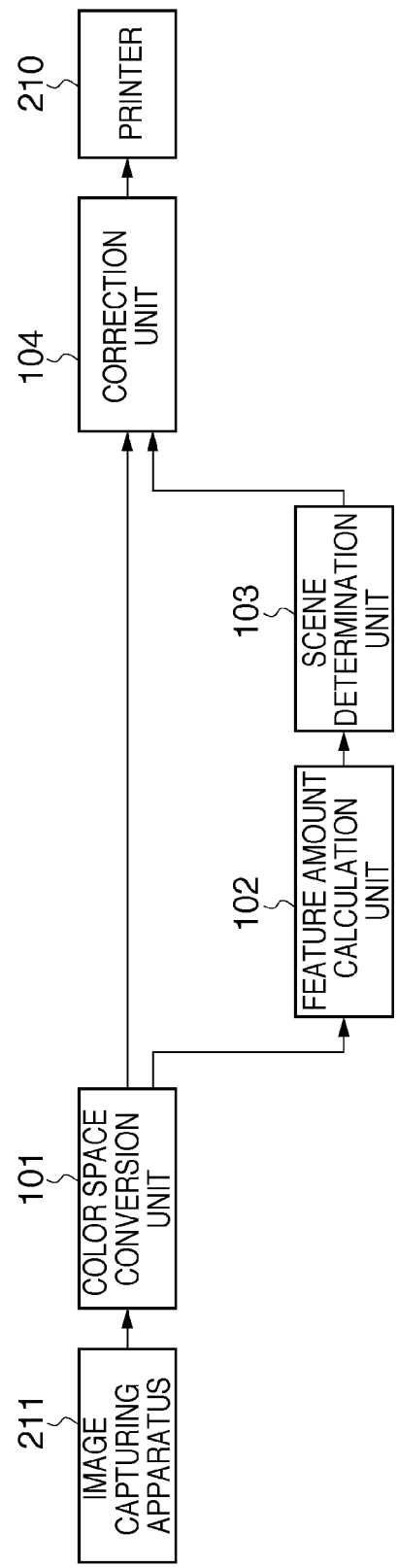
FIG. 1 is a block diagram showing a functional configuration of an image processing system according to an embodiment of the present invention.

Hereinbelow, the outline of the image processing system according to the embodiment of the present invention will be described with reference to the drawings. FIG. 1 is a block diagram showing a functional configuration of an image processing system according to an embodiment of the present invention.

The image processing system has an image capturing apparatus 211, a color space conversion unit 101, a feature amount calculation unit 102, a scene determination unit 103, a correction unit 104 and a printer 210.

In The image capturing apparatus 211 such as a digital camera, a photographed image is stored as digital image data on a recording medium such as a memory card. Otherwise, the image capturing apparatus 211 may be a scanner to read an original and obtain a file as a digital image data. Further, the image capturing apparatus 211 may be an apparatus to obtain an image file from such digital camera or scanner. The color space conversion unit 101 converts digital image data inputted from the image capturing apparatus 211 into image data in color space necessary for the feature amount calculation unit 102, and transmits the color-space converted image data to the feature amount calculation unit 102. Further, the color space conversion unit 101 converts the digital image data inputted from the image capturing apparatus 211 into image data in color space necessary for the correction unit 104, and transmits the color-space converted image data to the correction unit 104. The feature amount calculation unit 102 calculates a feature amount of a brightness component and a feature amount of a color variation component from the image data color-space converted by the color space conversion unit 101. The scene determination unit 103 calculates distances between a value obtained by combining the feature amounts calculated by the feature amount calculation unit 102 and representative values obtained by combining plural feature amounts indicating previously-set respective scenes. Then, the scene determination unit 103 determines, among the calculated distances with respect to the representative values, a scene with a representative value with the shortest distance as a scene of the obtained image. Further, the scene determination unit 103 (also having a scene reliability calculation function) calculates the reliability of the determined scene (scene reliability) utilizing the calculated distance with respect to the representative value. Further, the scene determination unit 103 calculates the weight of the determined scene (representative point reliability) utilizing previously-set weights of the respective representative values. Then, the scene determination unit 103 calculates final scene reliability (first scene reliability) by multiplying the scene reliability by the representative point reliability. The correction unit 104 performs gradation correction process in correspondence with the scene determined by the scene determination unit 103, and controls a gradation correction amount in correspondence with the first scene reliability calculated by the scene determination unit 103. The printer 210 prints an image based on the image data corrected by the correction unit 104 onto a print medium.

Figure 3:
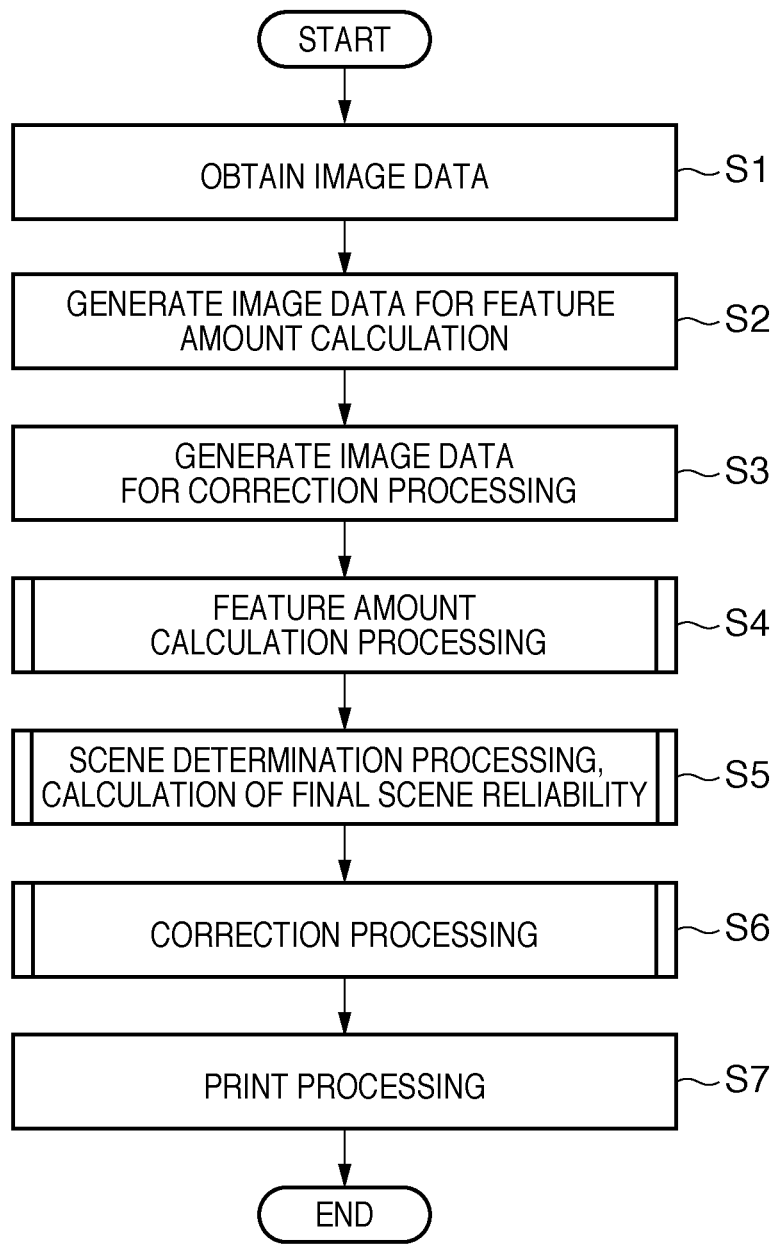
FIG. 3 is a flowchart describing an operation procedure in the image processing system according to the embodiment.

FIG. 3 is a flowchart describing an operation procedure by the computer 200 in the image processing system according to the embodiment of the present invention. A program to perform the processing is loaded from the secondary storage unit 205 to the RAM 204 upon execution, and executed under the control of the CPU 202.

First, in step S1, a file including digital image data is obtained from the image capturing apparatus 211. Then, the image data and attribute information showing an image size and the like are obtained from the file, and transmitted to the color space conversion unit 101. For example, if the obtained file is a compressed JPEG (Joint Photographic Experts Group) image file, decompression of the image data is performed. "JPEG" indicates a still image data compression method regarding photographed image data. Next, the process proceeds to step S2, in which the color space conversion unit 101 converts the obtained image data into image data in color space necessary for the feature amount calculation unit 102 and transmits the converted image data to the feature amount calculation unit 102. Next, the process proceeds to step S3, in which the color space conversion unit 101 converts the obtained image data into image data in color space necessary for the correction unit 104 and transmits the converted image data to the correction unit 104. The color space conversion processing is made by well-known color conversion processing. For example, if the color space of image data inputted into the color space conversion unit 101 is RGB and the color space necessary for the feature amount calculation unit 102 is YCbCr, then the color space conversion processing is performed by using the following conversion expression regulated in the ITU-R BT.601.

$$Y = 0.299 \times R + 0.587 \times G + 0.144 \times B$$

$$Cb = -0.169 \times R - 0.331 \times G + 0.500 \times B$$

$$Cr = 0.500 \times R - 0.419 \times G - 0.081 \times B \quad (1)$$

Next, the process proceeds to step S4, in which the feature amount calculation unit 102 analyzes the image data inputted from the color space conversion unit 101, calculates feature amounts of brightness component and color variation component, and transmits the feature amounts to the scene determination unit 103. For example, an average value of luminance (Y) as a brightness component is calculated from image data in YCbCr color space. Further, a distributed value of color difference (Cb) as a color variation component is calculated, and these values are sent as feature amounts.

The luminance (Y) average value is calculated by using the following conversion expression.

$$\text{luminance } (Y) \text{ average value} = \sum_{0}^{255} \frac{\{(\text{luminance value } (Y)) \times (\text{frequency})\}}{(\text{number of all pixels})} \quad (2)$$

The color difference (Cb) average value is obtained by using the following conversion expression, and the color difference distributed value is calculated.

$$\text{color difference } (Cb) \text{ average value} = \sum_{0}^{255} \frac{\{(\text{color difference value } (Cb)) \times (\text{frequency})\}}{(\text{number of all pixels})} \quad (3)$$

$$\text{color difference } (Cb) \text{ distributed value} = \sum_{0}^{255} \frac{\left\{\begin{array}{l}(\text{color difference value } (Cb)) - \\ (\text{color difference average value})\end{array}\right\}^2}{(\text{number of all pixels})} \quad (4)$$

Next, the process proceeds to step S5, in which the scene determination unit 103 calculates distances between a value obtained by combining the feature amounts calculated by the feature amount calculation unit 102 and respective representative values indicating previously-set respective scenes. Then, the scene determination unit 103 determines, among the calculated distances with respect to the respective representative values, a scene with the representative value with the shortest distance as a scene of the input image data. Further, the scene determination unit 103 calculates the reliability of the determined scene (second scene reliability) by utilizing the distance of the scene with respect to the representative value. Further, the scene determination unit 103 calculates the weight of the determined scene (representative point reliability) by utilizing previously-set weights of the respective representative values. Then, the scene determination unit 103 multiplies the scene reliabilities (second scene reliability) by the representative point reliability, thereby calculates a final scene reliability (first scene reliability).

In this case, for example, as the feature amounts, a luminance (Y) average value as a feature amount of a brightness component and a color difference (Cb) distributed value as a feature amount of a color variation component are used. Further, similarly, as multiple feature amounts indicating the previously-set respective scenes, a luminance (Y) average value as a feature amount of a brightness component and a color difference (Cb) distributed value as a feature amount of a color variation component are used. Then as the previously-set respective scenes, two scenes, a nightscape scene and an underexposure scene are used. Then three representative values obtained by combining the feature amounts, the luminance (Y) average value and the color difference (Cb) distributed value are set for the nightscape scene. On the other hand, four representative values obtained by combining the feature amounts, in other words, the luminance (Y) average value and the color difference (Cb) distributed value are set for the underexposure scene. Thus, the differences between the combined value of the feature amounts calculated from the input image data and these seven representative values are calculated, and a representative value with the minimum difference is obtained. A scene with the minimum difference representative value is determined as the scene of the input image data. Further, the reliability of the determined scene (second scene reliability) is calculated by utilizing the distance of the scene with respect to the representative value. For example, assuming that a value with the minimum difference is A, and a value with the next minimum difference, B, the scene reliability (second scene reliability) is expressed as follows.

$$\text{scene reliability} = [\{(A+B)/2\} - A]/\{(A+B)/2\} \quad (5)$$

Further, the weight of the determined scene (representative point reliability) is calculated by utilizing the weights of the respective representative values. Then, the final scene reliability (first scene reliability) is calculated by multiplying the scene reliability by the representative point reliability.

Next, the process proceeds to step S6, in which the correction unit 104 performs correction processing in correspondence with the scene determined by the scene determination unit 103 and the first scene reliability. For example, the correction processing is performed with different gradation correction processings in correspondence with whether the scene is a nightscape scene or an underexposure scene. For example, if the determined scene is a nightscape scene, then correction is performed such that a dark area becomes darker while a bright area becomes brighter so as to prevent the luminance average value after the correction from exceeding the initial luminance average. Further, if the determined scene is an underexposure scene, then correction processing is performed such that the entire image becomes brighter so as to allow the luminance average value after the correction to exceed the initial luminance average value. Further, the correction amount is controlled in correspondence with the first scene reliability calculated by the scene determination unit 103. The correction amount control will be described in detail later. Next, the process proceeds to step S7, in which the image data corrected by the correction unit 104 is outputted to the printer 210 and print-outputted. For example, control is performed so as to convert the corrected image data to data for CMYK ink colors, and print the image data on a print sheet.

Hereinbelow, the details of the respective processing units of the image processing system in the present embodiment will be described with reference to the drawings. The color space conversion unit 101 converts digital image data obtained with the image capturing apparatus 211 into image data in color space necessary for the feature amount calculation unit 102, and transmits the color-space converted image data to the feature amount calculation unit 102. Further, the color space conversion unit 101 converts the digital image data obtained with the image capturing apparatus 211 into image data in color space necessary for the correction unit 104 and transmits the color-space converted image data to the correction unit 104. The color space conversion processing is used for generation of output image data which is converted in a color space different from that of input image data. The input image data is digital image data obtained with the image capturing apparatus 211. The color space of the input image data is the color space of the digital image data obtained with the image capturing apparatus 211. The color space of the output image data is color space used upon analysis processing by the feature amount calculation unit 102. Otherwise, the color space of the output image data is color space used upon correction processing by the correction unit 104. As the color space conversion processing, various methods are available, and as long as output image data in color space converted from that of input image data is generated, any method can be used.

The feature amount calculation unit 102 is a processing unit to calculate a feature amount of a brightness component and a feature amount of a color variation component from the image data color-space converted by the color space conversion unit 101. The feature amount calculation unit 102 will be described with reference to FIGS. 4, 5A and 5B.

Figure 4:
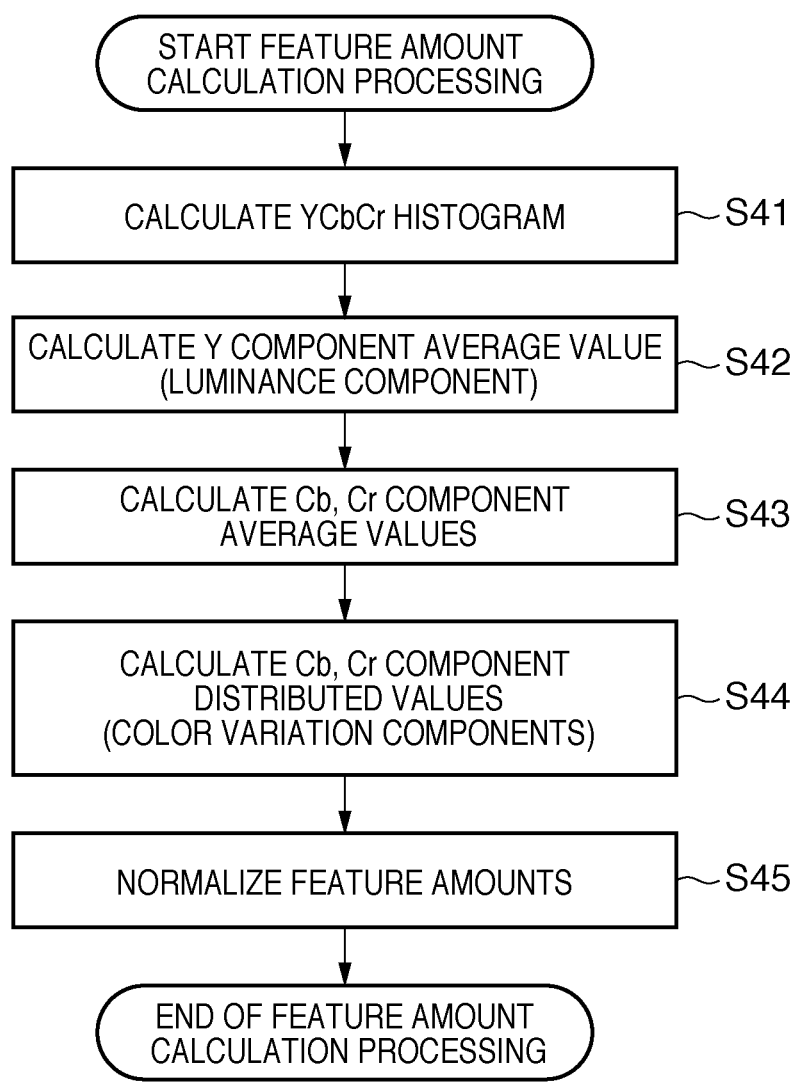
FIG. 4 is a flowchart describing an operation procedure by a feature amount calculation unit according to the embodiment.

FIG. 4 is a flowchart describing an operation procedure by the feature amount calculation unit 102 according to the embodiment of the present invention.

Figure 5A:
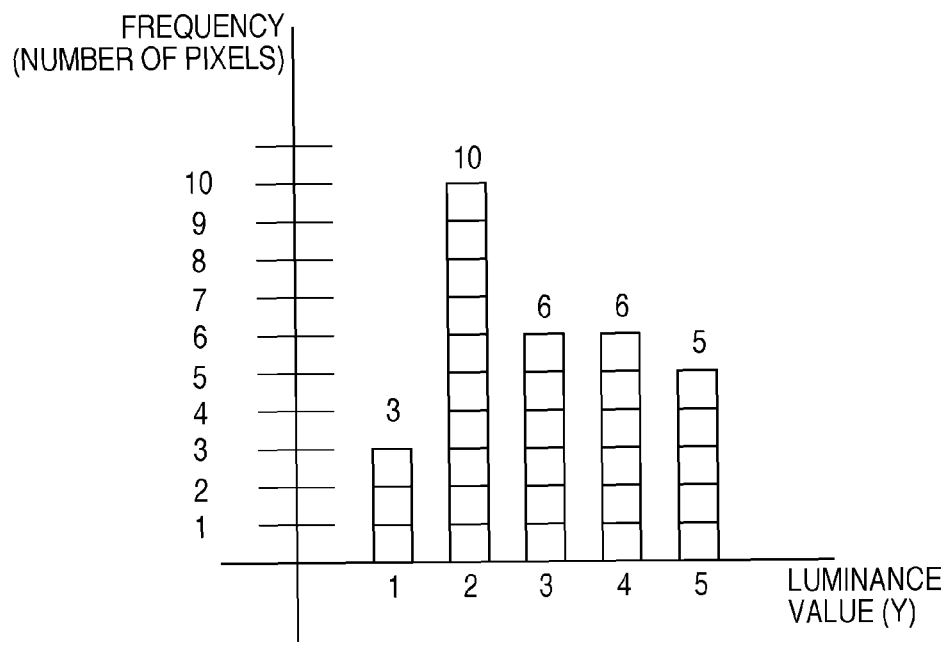
FIGS. 5A and 5B depict view showing graphs illustrating examples of histograms of luminance (Y) and color difference (Cb)
Figure 5B:
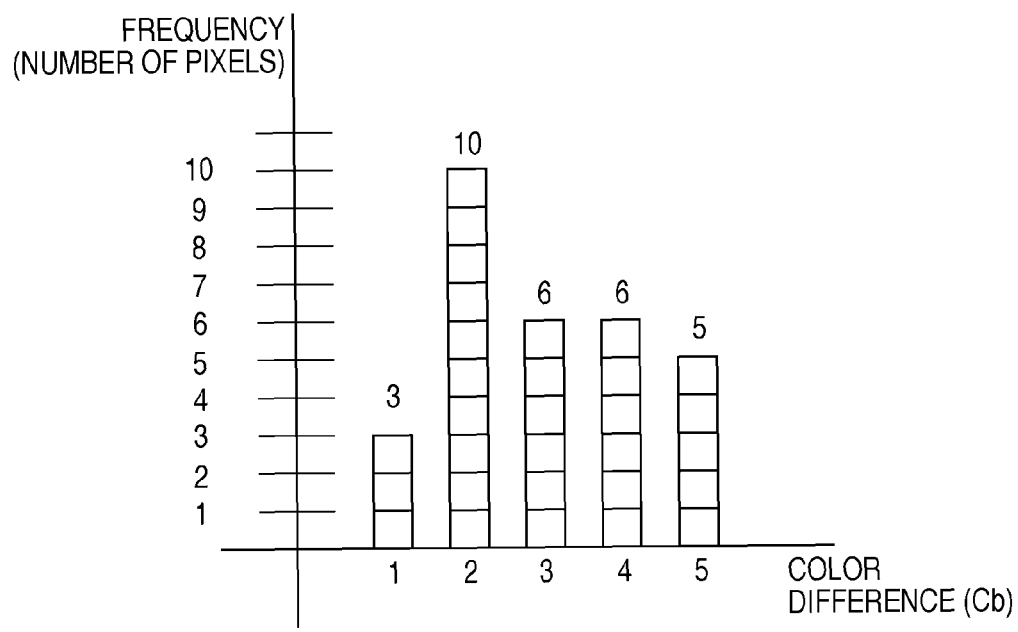

FIG. 5A depicts a view illustrating a graph describing a histogram of the luminance (Y) according to the embodiment, and FIG. 5B depicts a view illustrating a graph describing a histogram of the color difference (Cb) according to the embodiment.

In this example, the image data inputted into the color space conversion unit 101 is image data in color space YCbCr.

Then an average value of the luminance values (Y) is calculated as the feature amount of the brightness component, and a distributed value of the color difference values (Cb) is calculated as the feature amount of the color variation component.

In the flowchart of FIG. 4, first, in step S41, the histogram of the YCbCr image data is calculated. Next, the process proceeds to step S42, in which from the calculated histogram, the average value of the luminance Y as the brightness component is calculated. At this time, in FIG. 5A, the luminance (Y) average value is obtained with the following expression (6).

$$\text{luminance } (Y) \text{ average value} = \sum_{1}^{30} \frac{\left\{ \begin{array}{c} (\text{luminance value } (Y)) \times \\ (\text{frequency}) \end{array} \right\}}{(\text{number of all pixels})} \quad (6)$$

In this case, the luminance (Y) average value is "3" from the following calculation.

luminance (Y) average value=((1×3)+(2×10)+(3×6)+ (4×6)+(5×5))/(3+10+6+6+5)=90/30=3

Next, the process proceeds to step S43, in which the color difference Cb average value is calculated from the calculated histogram.

The color difference (Cb) average value is obtained with the following expression in a case that the color difference (Cb) histogram is as shown in FIG. 5B.

$$\text{color difference } (Cb) \text{ average value} = \quad (7)$$

$$\sum_{1}^{30} \frac{\left\{ \begin{array}{c} (\text{color difference } (Cb)) \times \\ (\text{frequency}) \end{array} \right\}}{(\text{number of all pixels})}$$

In this case, the color difference (Cb) average value is "3". The calculation expression in this case is color difference (Cb) average value=((1×3)+(2×10)+ (3×6)+(4×6)+(5×5))/(3+20+18+24+25)=90/30=3

Next, the process proceeds to step S44, in which the distributed value of the color difference Cb as the color variation component is calculated from the calculated histogram.

In this case, the color difference (Cb) distributed value is obtained with the following expression.

$$\text{color difference } (Cb) \text{ distributed value} = \quad (8)$$

$$\sum_{1}^{30} \frac{\left\{ \begin{array}{c} (\text{color difference value } (Cb)) - \\ (\text{color difference average value}) \end{array} \right\}^2}{(\text{number of all pixels})}$$

In a case that the histogram of the color difference (Cb) is as shown in FIG. 5B, the Cb distributed value is "1.6" from the above expression (8). The calculation in this case is as follows.

color difference (Cb) distributed value=((1−3)²×3)+ ((2−3)²×10)+((3−3)²×6)+((4−3)²×6)+((5−3)²×5)/ (3+10+6+6+5)=48/30=1.6

Next, the process proceeds to step S45, in which the brightness component feature amount and the color variation component feature amount calculated in steps S42 and S44 are normalized to values from 0 to 100. For example, as normalization, if the assumed range of the average value of the luminance (Y) as the brightness component is a value from 0 to 255, then the value from 0 to 255 is converted to a value from 0 to 100.

normalized luminance (Y) average value={(luminance (Y) average value)/255}×100

Further, for example, in a case that the color difference (Cb) distributed value is normalized, a value from 0 to 16384 is converted to a value from 0 to 100, and a value greater than 16384 is converted to 100.

normalized color difference (Cb) distributed value={color difference (Cb) distributed value/16384}×100

The feature amount calculation unit 102 outputs the normalized values of the brightness component feature amount and the color variation component feature amount to the scene determination unit 103.

In the present embodiment, as a feature amount indicating the brightness component, the luminance (Y) average value is used, however, the brightness component feature amount is not limited to this value as long as the feature amount indicates the brightness component. For example, a maximum value, a minimum value or a median value of the luminance (Y) may be obtained as the feature amounts indicating the brightness component. Further, upon calculation of the above-described feature amount as the feature amount indicating the brightness component, it may be calculated within a certain region. For example, if the luminance (Y) is within the range from 0 to 255, then the luminance (Y) average value may be calculated while 0 and 255 are excluded. Further, the luminance (Y) average value corresponding to 0 to 5% of the number of all pixels may be calculated from the luminance (Y) maximum value.

Further, in the present embodiment, the luminance (Y) on YCbCr color space is used as a feature amount indicating the brightness component, however, the feature amount is not limited to this feature value as long as it indicates the brightness component. For example, as a feature amount indicating the brightness component, L (luminance) of Lab color system in which the color space is regulated in JIS Z8729 or Luv color system in which the color space is regulated in JIS Z8518 may be used. Further, as a feature amount indicating the brightness component, any feature amount may be used as long as it indicates the brightness component on various color spaces such as v (brightness) in HSV color space.

Further, in the present embodiment, the feature amount indicating the color variation component is the color difference (Cb) distributed value, however, the feature amount is not limited to this feature amount as long as it indicates the color variation component. For example, the feature amount indicating the color variation component may be a standard deviation value of the color difference (Cb), a (maximum value-minimum value) of the color difference (Cb), a total difference value from the average values or the like. Further, in the present embodiment, the feature amount indicating the color variation component is the color difference (Cb) on YCbCr color space is used, however, the feature amount is not limited to this feature amount as long as it indicates the color variation component. For example, any feature amount may be used as long as it indicates the color variation component on various color space such as color difference (Cr) on YCbCr color space or H (color hue) on HSV color space. Further, in the present embodiment, as the feature amount indicating the color variation component, the color difference (Cb) distributed value is used, however, a feature amount indicating the color variation component within a certain threshold region may be used. For example, a feature amount indicating the color variation component within a certain threshold region such as a color difference (Cb or Cr) distributed value of pixels around the luminance (Y) maximum value and minimum value may be used.

Further, in the present embodiment, as a combination of brightness component and color variation component feature amounts, the luminance (Y) average value and the color difference (Cb) distributed value are used, however, two or more feature amounts may be combined as long as they include at least the brightness component and the color variation component. For example, as a combination of the brightness component and color variation component feature amounts, a luminance (Y) average value, a color difference (Cb) distributed value and a color difference (Cr) distributed value may be used. Further, as the combination of feature amounts including the brightness component and the color variation component, an average value, a maximum value and a minimum value of R, G and B components in RGB color space, a saturation (S) average value, a maximum value and a minimum value in HSV color space, or the like, may be used.

The scene determination unit 103 calculates distances between the value obtained by combining the feature amounts calculated by the feature amount calculation unit 102 and representative values as combinations of plural feature amounts indicating previously-set respective scenes. Then scene determination unit 103 determines, among the calculated distances with respect to the representative values, a scene indicating a representative value with the shortest distance as a scene of the obtained image data. Further, the scene determination unit 103 calculates the reliability of the determined scene (scene reliability) by utilizing the calculated distance with respect to the representative value. Further, the scene determination unit 103 calculates the weight of the determined scene (representative point reliability) by utilizing the weights of the respective representative values. Then the scene determination unit 103 calculates the final scene reliability (first scene reliability) by multiplying the scene reliability by the representative point reliability.

The scene determination processing by the scene determination unit 103 will be described with reference to FIGS. 6 and 7.

Figure 6:
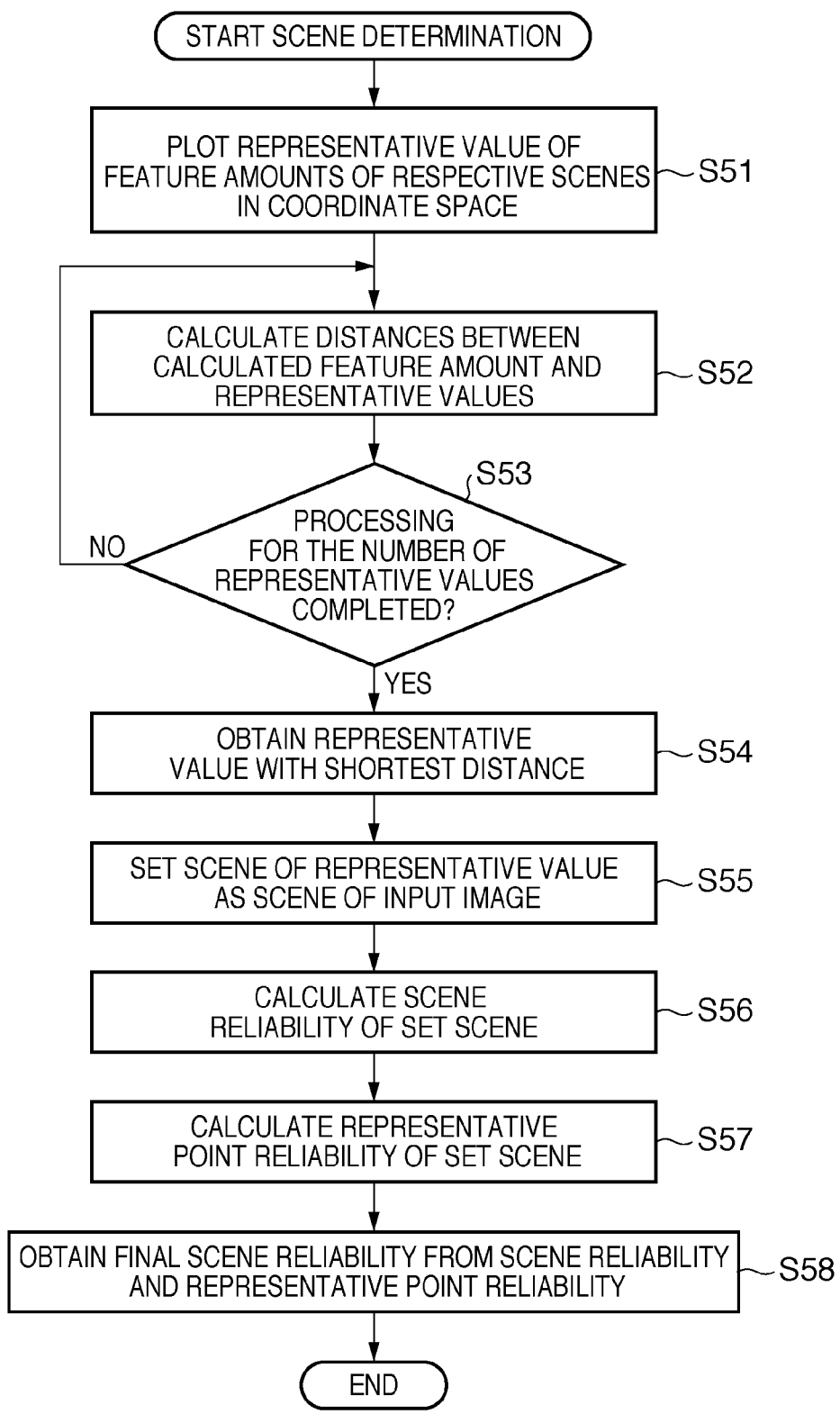
FIG. 6 is a flowchart describing an operation procedure by a scene determination unit according to the embodiment.

FIG. 6 is a flowchart describing an operation procedure by the scene determination unit 103 according to the embodiment. FIG. 7 depicts a view illustrating a graph describing a scene determination method according to the embodiment.

Figure 7:
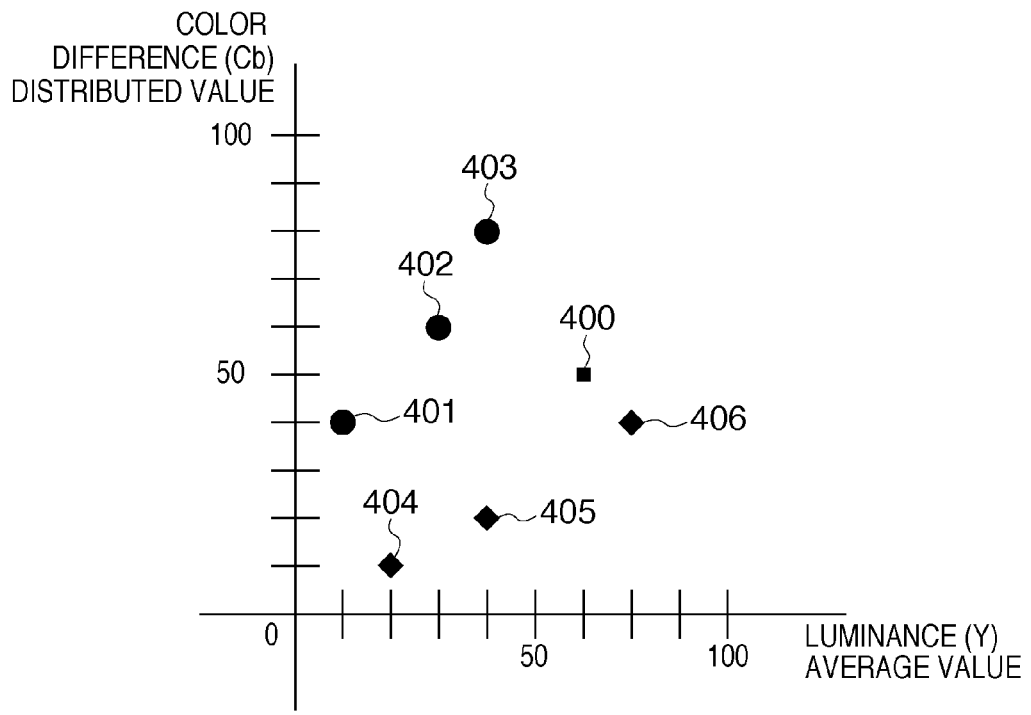
FIG. 7 depicts a view illustrating a graph showing a scene determination method according to the embodiment.

FIG. 7 shows a two-dimensional feature amount space (two-dimensional space) in which the lateral axis indicates the normalized average value of luminance (Y) as a brightness component and the vertical axis indicates the normalized distributed value of color difference (Cb) as a color variation component. A coordinate point 400 indicates a coordinate position (first representative point) of the normalized average value of luminance (Y) as a brightness component and the normalized distributed value of color difference (Cb) as a color variation component of the input image data calculated by the feature amount calculation unit 102, in the two-dimensional feature amount space. Further, coordinate points 401 to 403 indicate feature amounts indicating a nightscape scene set in the two-dimensional feature space (second representative points). Further, coordinate points 404 to 406 indicate feature amounts indicating an underexposure scene set in the two-dimensional feature amount space. In this case, the values of the respective coordinate points 400 to 406 are, for example, as follows.

coordinate point (Xa, Yb)=(luminance (Y) average value, color difference (Cb) distributed value)

coordinate point 400 (X0,Y0)=(60,50)
    coordinate point 401 (X1,Y1)=(10,40)
    coordinate point 402 (X2,Y2)=(30,60)
    coordinate point 403 (X3,Y3)=(40,80)
    coordinate point 404 (X4,Y4)=(20,10)
    coordinate point 405 (X5,Y5)=(40,20)
    coordinate point 406 (X6,Y6)=(80,40)

In FIG. 6, in step S51, a value obtained by combining a value as a combination of the feature amounts calculated by the feature amount calculation unit 102, and representative values obtained by combining multiple feature amounts indicating previously-set respective scenes, are plotted in the feature amount coordinate space. For example, the coordinate point 400 (FIG. 7) is plotted as the value obtained by combining the feature amounts calculated by the feature amount calculation unit 102, and the coordinate points 401 to 406 (FIG. 7) corresponding the representative values indicating the respective scenes are plotted. Next, the process proceeds to step S52, in which the distances between the value (coordinate point 400) calculated by the feature amount calculation unit 102 and the representative values (coordinate points 401 to 406) of the respective scenes are calculated. For example, assuming that the coordinates of the value as a combination of the feature amounts calculated by the feature amount calculation unit 102 are (Xa,Ya) and one of the representative values indicating the respective scenes is coordinates (Xb, Yb), the distance therebetween is expressed with the following expression (9).

$$\text{distance}=(Xa-Xb)^2+(Ya-Yb)^2 \quad (9)$$

Next, the process proceeds to step S53, in which it is determined whether or not processing has been performed for the number of representative values of previously-set scenes. In the above-described example, as the number of representative values of the respective scenes (coordinate points 401 to 406) is six, it is determined whether or not the distance calculation has been performed for six distances. In accordance with the above example, the results of distance calculation between the coordinate point 400 as a value calculated by the feature amount calculation unit 102 and the coordinate points 401 to 406 are as follows.

distance between coordinate point 400(X0,Y0) and coordinate point 401 (X1,Y1)=(X0−X1)²+(Y0−Y1)²=(60 − 10)²+(50−40)²=2600 distance between coordinate point 400(X0,Y0) and coordinate point 402 (X2,Y2)=(X0−X2)²+(Y0−Y2)²=(60 − 30)²+(50-60)²=1000 distance between coordinate point 400(X0,Y0) and coordinate point 403 (X3,Y3)=(X0−X3)+(Y0−Y3)²=(60-40)²+ (50-80)²=1300 distance between coordinate point 400(X0,Y0) and coordinate point 404 (X4,Y4)=(X0−X4)+(Y0−Y4)²=(60-20)²+ (50-10)²=3200 distance between coordinate point 400(X0,Y0) and coordinate point 405 (X5,Y5)=(X0−X5)+(Y0−Y5)²=(60-40)²+ (50-20)²=1300 distance between coordinate point 400(X0,Y0) and coordinate point 406 (X6,Y6)=(X0−X6)+(Y0−Y6)²=(60-80)²+ (50-40)²=500

Next, the process proceeds to step S54, in which, among the distances with respect to the representative values calculated in step S52, a representative value with the shortest distance is obtained. In the above-described example, as the distance (L6) between the coordinate point 400 (X0, Y0) of the feature amount of the input image data and the coordinate point 406 (X6,Y6) is the shortest, the coordinate point 406 of an underexposure scene is determined as a representative value. Next, the process proceeds to step S55, in which it is determined that the scene of the representative value with the shortest distance is the scene of the input image data. In the above-described example, as the scene of the coordinate point 406 with the shortest distance is an underexposure scene, the scene of the obtained image data is determined as an underexposure scene.

Next, the process proceeds to step S56, in which the reliability of the determined scene (scene reliability) is calculated by utilizing the distance with respect to the representative value calculated in step S52. The scene reliability is calculated based on the ratio between the shortest distance (La) and the next shortest distance (Lb). The scene reliability is calculated with the following expression (10).

$$\text{scene reliability}=[\{(La+Lb)/2\}-La]/\{(La+Lb)/2\} \quad (10)$$

In the above-described example, the shortest distance (La) is the distance between the coordinate point 400 (X0,Y0) and the coordinate point 406 (X6,Y6) and its value is "500". The next shortest distance (Lb) is the distance between the coordinate point 400 (X0,Y0) and the coordinate point 402 (X2, Y2) and its value is "1000". Accordingly, the scene reliability in this case is, $$\text{scene reliability}=[\{(500+1000)/2\}-500]/\{(500+1000)/2\}=250/750=1/3$$

Next, the process proceeds to step S57, in which the weight of the determined scene (representative point reliability) is calculated by utilizing the weights of the respective representative values. For example, the weights of the respective representative values are as follows.

weight of coordinate point 401 (W1)=0.6
    weight of coordinate point 402 (W2)=0.8
    weight of coordinate point 403 (W3)=1.0
    weight of coordinate point 404 (W4)=1.0
    weight of coordinate point 405 (W5)=0.8
    weight of coordinate point 406 (W6)=0.6

In the above-described example, as the shortest distance is the distance (L6) between the coordinate point 400 (X0,Y0) and the coordinate point 406 (X6,Y6), the weight (W6) of the coordinate point 406, "0.6", is set as the representative point reliability.

Next, the process proceeds to step S58, in which the scene reliability obtained in step S56 is multiplied by the representative point reliability obtained in step S57, thereby the final scene reliability (first scene reliability) is calculated (first scene reliability calculation processing). For example, in the above-described example, as the scene reliability is "⅓" and the representative point reliability is "0.6", the final scene reliability is obtained with the following expression (11).

$$\text{final scene reliability}=\text{scene reliability}\times\text{representative point reliability}=\frac{1}{3}\times 0.6=0.2 \quad (11)$$

In the present embodiment, the representative values of the respective scenes are arbitrarily set, however, the present invention is not limited to this example. For example, it may be arranged such that image data of some scene is set and a representative value is obtained from the feature amount of the set image data. For example, it may be arranged such that respectively five underexposure scene images and nightscape scene images are selected, then respective feature amounts of brightness component and color variation component of image data of the total ten images are calculated, and the calculated values are set as representative values. Further, it may be arranged such that, from feature amounts of image data of arbitrarily designating scenes, the representative values are set by calculating as feature amounts for classification of the scenes by learning. In this case, as a method of learning, it may be arranged such that the image data is analyzed with respect to a set of a certain number of sample data, then useful regulations, rules, determination references and the like are extracted from the analysis data, and feature amounts obtained from these data are set as representative values. As this leaning method, the well-known Genetic Algorithm (GA) or the Neural Network may be used. Further, any of boosting algorithms as a sort of machine learning meta algorithm for execution of supervised learning may be used. Further, any one of principal component analysis, cluster analysis, Vector Quantization (VQ) as a sort of machine learning meta algorithm for execution of unsupervised learning may be used.

In the present embodiment, the above-described expression is used as a method of scene reliability calculation, however, the calculation is not limited to this method as long as a relative distance with respect to plural representative values can be calculated. For example, the distance may be calculated with any one of the following expressions.

$$distance = \sqrt{\{(Xa-Xb)+(Ya-Yb)^2\}}$$

$$distance = (Xa-Xb)+(Ya-Yb)$$

$$distance = \{(Xa-Xb)+(Ya-Yb)^2\}/2$$

In the present embodiment, the scene reliability is calculated from the ratio between the distance of a representative value with the shortest distance and the distance of a representative value with the next shortest distance, however, the present invention is not limited to this calculation. For example, it may be arranged such that a scene set regarding a representative value with the shortest distance is obtained, then among representative values of scenes different from the scene, a representative value with the shortest distance is determined. Further, it may be arranged such that the scene reliability is calculated from the ratio between a distance with respect to a representative value with the shortest distance and a distance with respect to a representative value with the shortest distance different from the distance with respect to the above representative value with the shortest distance.

Further, in the present embodiment, the weight by representative value is arbitrarily set, however, the present invention is not limited to this setting. It may be arranged such that the weight is set from a value calculated by learning a representative value.

Figure 8:
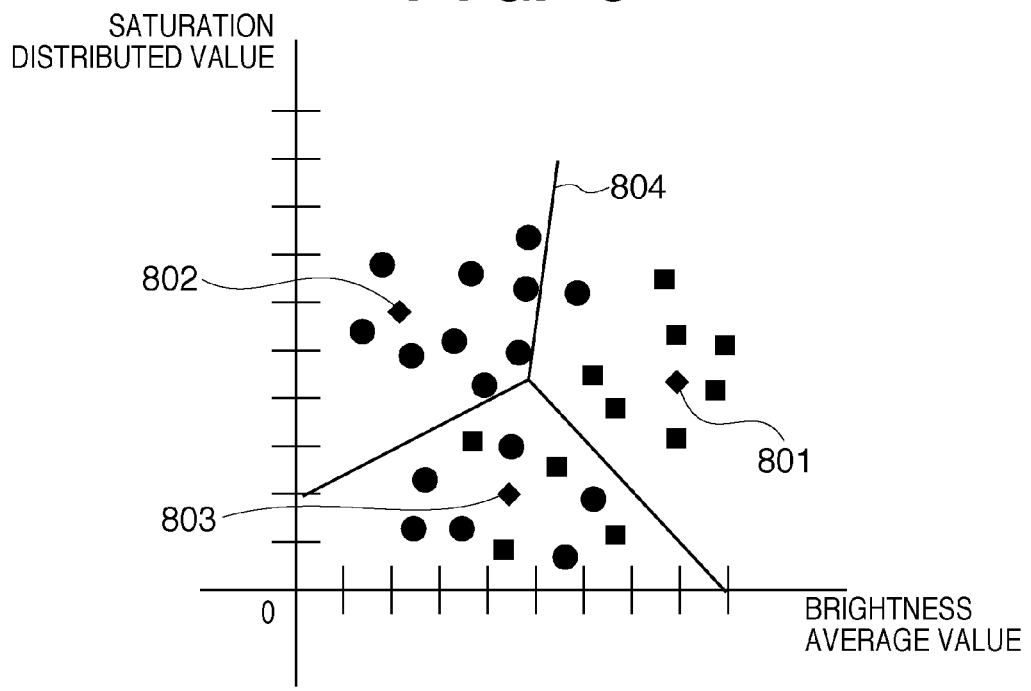
FIG. 8 depicts a view illustrating a graph describing an image plotted on two-dimensional feature amount space of brightness average value and saturation distributed value.

FIG. 8 depicts a view illustrating a graph describing an image plotted on two-dimensional feature amount space where the lateral axis indicates brightness average value and the vertical axis indicates saturation distributed value.

In FIG. 8, a square indicates an underexposure landscape scene image, and a circle, a nightscape scene image. Rhombus coordinate points 801 to 803 are representative values calculated by learning. Note that the scene of the coordinate point 801 is an underexposure landscape scene. Further, the scenes of the coordinate points 802 and 803 are nightscape scenes. Further, the scenes of the coordinate points 801 to 803 as the respective representative values are determined based on image scenes included in the regions partitioned with a threshold value 804. For example, the scene of the coordinate point 801 includes seven underexposure landscape scene images (squares) and one nightscape scene image (circle), in other words, total eight images. Further, the scene of the coordinate point 802 includes nine nightscape scene images (circles). Further, the scene of the coordinate point 803 includes four underexposure landscape scene images (squares) and six nightscape scene images (circles), in other words, total ten images.

Note that it may be arranged such that the weight of the representative value is calculated in accordance with the following expression (12) from the ratio between, among the scenes included in the respective regions, the number of images of the most frequent scenes (M) and the number of images included in the region (N).

$$weight = M/N \qquad (12)$$

In the example of FIG. 8, weight of representative value of coordinate point 801=7/8=0.875 weight of representative value of coordinate point 802=9/9=1.0 weight of representative value of coordinate point 803=6/10=0.6

Further, it may be arranged such that the weight of the representative value is calculated in accordance with the following expression (13) from the ratio between, among the images included in the respective regions, the number of images of the most frequent scene (M) and the total number of images (T) included in all the regions.

$$weight = M/T \qquad (13)$$

In the example of FIG. 8, as the number of all the images in FIG. 8 is "27", weight of representative value of coordinate point 801=7/27≅0.259 weight of representative value of coordinate point 802=9/27≅0.333 weight of representative value of coordinate point 803=6/27≅0.222

Further, it may be arranged such that the weight of the representative value is calculated in accordance with the following expression (14) from the ratio between, among the images included in the respective threshold regions, the number of images of the most frequent scene (M) and the number of images included in the next most frequent scene (S).

$$weight = (M)/(M+S) \qquad (14)$$

In the example of FIG. 8, weight of representative value of coordinate point 801=7/(7+1)=0.875 weight of representative value of coordinate point 802=9/(9+0)=1.00 weight of representative value of coordinate point 803=6/(6+4)=0.60

Further, in the present embodiment, the final scene reliability (first scene reliability) is calculated by multiplying the scene reliability by the representative point reliability, however, the present invention is not limited to this calculation as long as the reliability is calculated by using the scene reliability and the representative point reliability. For example, it may be arranged such that a value obtained by adding the scene reliability to the representative point reliability is calculated as the final scene reliability (first scene reliability).

Further, in the present embodiment, the scene determination is performed on the two-dimensional feature amount space (two-dimensional space), however, the feature amount space may be multidimensional feature amount space (multidimensional space) such as three-dimensional feature amount space (three-dimensional space) or four-dimensional feature amount space (four-dimensional space). For example, a scene determination method on three-dimensional feature amount space using normalized average value of luminance (Y) as a brightness component, normalized average value of color difference (Cb) as a color variation component and normalized maximum value of luminance (Y) as a brightness component will be described.

Figure 11:
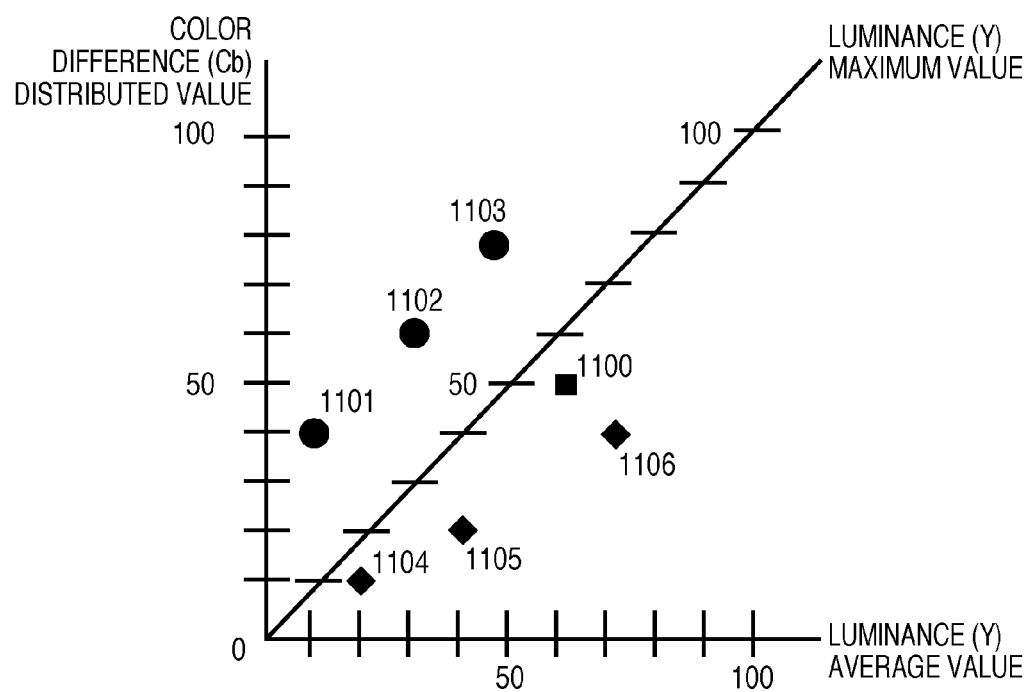
FIG. 11 depicts a view illustrating a graph describing the scene determination method according to the embodiment.

FIG. 11 shows three-dimensional feature amount space (three-dimensional space) where the X-axis indicates a normalized average value of luminance (Y) as the brightness component, the Y-axis indicates a normalized distributed value of color difference (Cb) as the color variation component, and the Z-axis indicates a normalized maximum value of luminance (Y) as the brightness component. A coordinate point 1100 indicates a coordinate position of the normalized average value of luminance (Y) as the brightness component, the normalized distributed value of color difference (Cb) as the color variation component and the normalized maximum value of luminance (Y) as the brightness component in the input image data calculated by the feature amount calculation unit 102 in the three-dimensional feature amount space, (first representative point). Coordinate points 1101 to 1103 indicate feature amounts indicating nightscape scenes set in the three-dimensional feature amount space (second representative points). Further, coordinate points 1104 to 1106 indicate feature amounts indicating underexposure scenes set in the three-dimensional feature amount space. In this example, the values of the respective coordinate points 1100 to 1106 are, for example, as follows.

coordinate point (Xa,Yb,Zb)=(luminance (Y) average value, color difference (Cb) distributed value, luminance (Y) maximum value)

coordinate point 1100 (X0,Y0,Z0)=(60,50,50)
 coordinate point 1101 (X1,Y1,Z1)=(10,40,20)
 coordinate point 1102 (X2,Y2,Z2)=(30,60,40)
 coordinate point 1103 (X3,Y3,Z3)=(40,80,60)
 coordinate point 1104 (X4,Y4,Z4)=(20,10,10)
 coordinate point 1105 (X5,Y5,Z5)=(40,20,20)
 coordinate point 1106 (X6,Y6,Z6)=(80,40,40)

The distance between the value (coordinate point 1100) calculated by the feature amount calculation unit 102 and the representative values (coordinate points 1101 to 1106) of the respective scenes are calculated. For example, the distance between the coordinate point (Xa,Ya,Za) of a value as a combination of the feature amounts calculated by the feature amount calculation unit 102 and one of the representative values (Xb,Yb,Zb) indicating the respective scenes is represented with the following expression (15).

$$\text{distance}=(Xa-Xb)+(Ya-Yb)+(Za-Zb)^2 \quad (15)$$

As in the case of the scene determination method on the two-dimensional feature amount space, the scene determination is performed by using the distances calculated on the three-dimensional feature amount space.

Next, the processing by the correction unit 104 will be described.

The correction unit 104 controls correction processing in correspondence with the scene determined by the scene determination unit 103 and the calculated final scene reliability.

Figure 9:
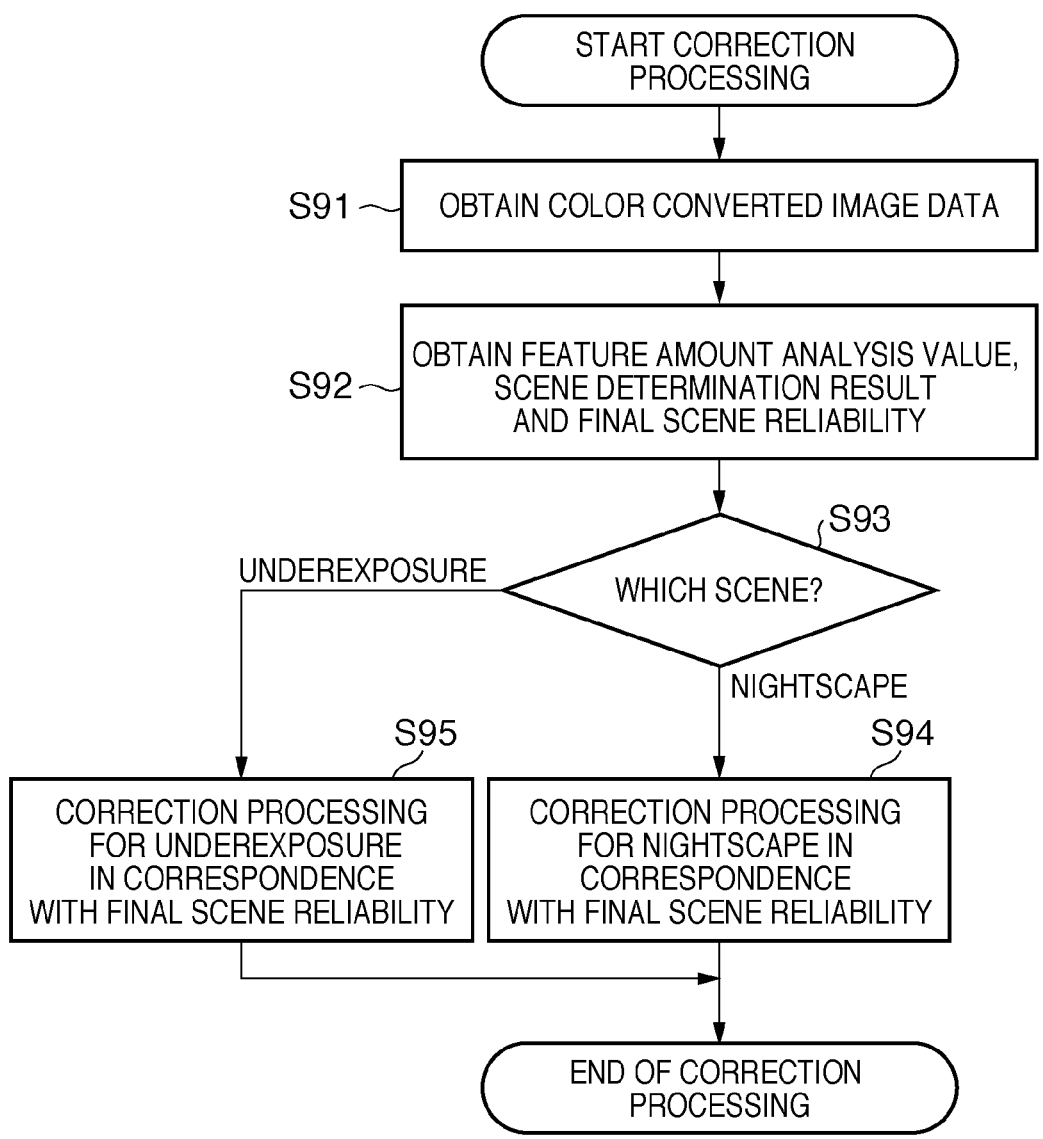
FIG. 9 is a flowchart describing an operation procedure by a correction unit according to the embodiment.

FIG. 9 is a flowchart describing an operation procedure by the correction unit 104 according to the embodiment of the present invention.

First, in step S91, image data color-space converted by the color space conversion unit 101 is inputted. For example, image data converted from YCbCr image data obtained by the image capturing apparatus 211 into image data in RGB color space is inputted. Next, the process proceeds to step S92, in which the feature amounts of the image data calculated by the feature amount calculation unit 102, the result of scene determination of the image data by the scene determination unit 103 and the final scene reliability are obtained. In this example, as the feature amount of the image data calculated by the characteristic amount calculation unit 102, the average value of luminance (Y) as the brightness component is inputted. Further, as the scene determination result by the scene determination unit 103, scene information indicating whether the determined result is an underexposure scene or nightscape scene, and the final scene reliability are inputted.

Next, the process proceeds to step S93, in which the scene of the image is determined based on the scene information. In this example, it is determined whether the image data indicates an underexposure scene or a nightscape scene. Then if it is determined that the image data indicates an underexposure scene, then the process proceeds to step S95. If it is determined that the image data indicates a nightscape scene, then the process proceeds to step S94. In step S94, gradation correction processing specialized for nightscape scene is performed. Further, in step S95, gradation correction processing specialized for underexposure scene is performed. Further, in these steps S94 and S95, the amount of correction is controlled in correspondence with the final scene reliability calculated by the scene determination unit 103.

Figure 10A:
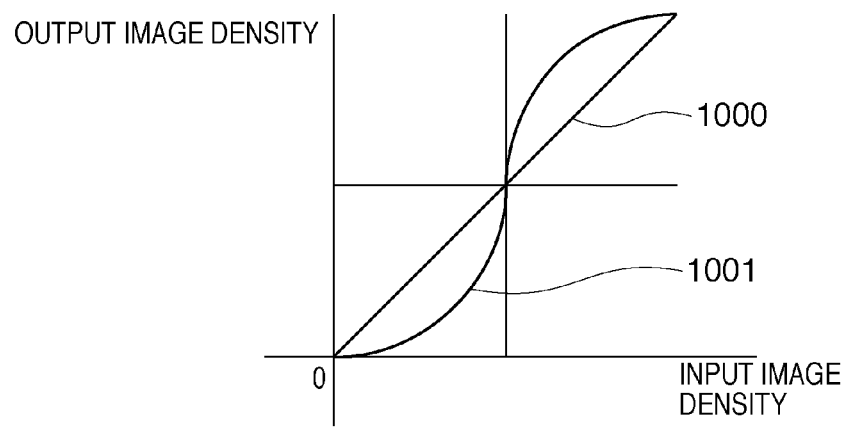
FIGS. 10A to 10C depict views illustrating graphs describing a γ curve used in image correction according to the embodiment.
Figure 10B:
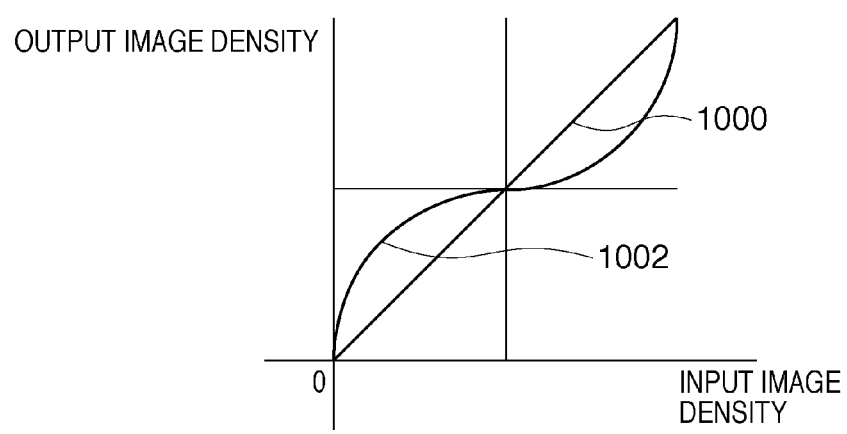
Figure 10C:
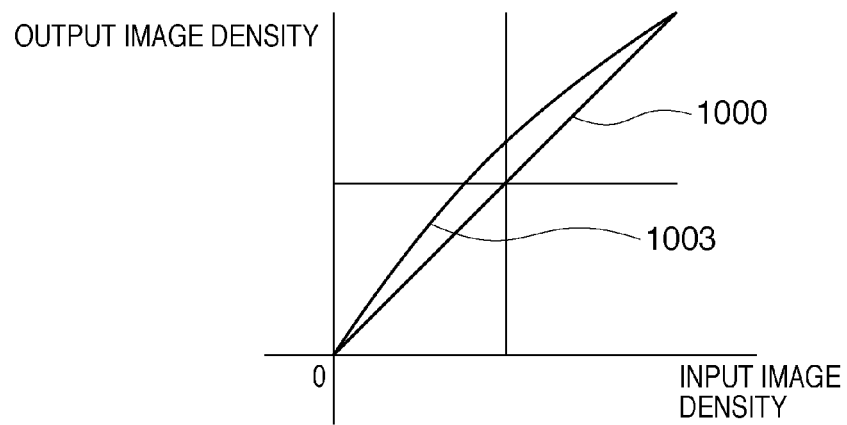

The control of correction amount will be described with respect to FIGS. 10A to 10C. FIGS. 10A to 10C are graphs showing a γ curve used in the image correction in the embodiment.

In FIGS. 10A to 10C, a straight line 1000 indicates a status where the density of output image data is the same value as that of input image data. Further, a γ curve 1001 in FIG. 10A indicates gradation correction to correct the densities of output image data such that a dark area becomes darker while a bright area becomes brighter, with respect to the densities of the input image data. Further, in FIG. 10B, a γ curve 1002 indicates gradation correction to correct the densities of the output image data such that the dark area becomes brighter while the bright area becomes darker, with respect to the densities of the input image data. Further, in FIG. 10C, a γ curve 1003 indicates gradation correction to correct the densities of the output image data such that the entire image becomes a little brighter with respect to the densities of the input image data.

In FIGS. 10A to 10C, the densities of the input image data are RGB values from 0 to 255. The conversion expressions in the correction processing are as follows.

$$R'=255\{(R/255)^{1/\gamma}\}$$

$$G'=255\{(G/255)^{1/\gamma}\}$$

$$B'=255\{(B/255)^{1/\gamma}\}$$

If the value of γ is greater than "1", then the output image data is brighter than the input image data. Further, if the value of γ is less than "1", then the output image data is darker than the input image data. When the scene determination result is a nightscape scene, correction is performed in step S94 as the correction processing for nightscape scene such that a dark area becomes darker while a bright area becomes brighter. For example, correction processing is performed with the γ curve 1001 in FIG. 10A.

On the other hand, if the scene determination result is an underexposure scene, then correction is performed in step S95 as the correction processing for underexposure scene such that a dark area becomes brighter while a bright area becomes darker. For example, correction processing is performed with the γ curve 1002 in FIG. 10B.

Further, if the scene determination result is a nightscape scene and the final scene reliability is low, then correction is performed such that the entire image becomes a little brighter. For example, correction processing is performed with the γ curve 1003 in FIG. 10C. Note that the value of the correction γ curve is determined based on the feature amount of obtained image data. For example, the value of the correction γ curve is determined based on the average value of luminance (Y) as the brightness component.

Note that as the value of the final scene reliability, 0<(final scene reliability)≤1 holds, and the threshold value for determination as to whether or not the final scene reliability is low is for example "0.6". If the final scene reliability is equal to or higher than "0.6", then it is determined that the final scene reliability is high. If the final scene reliability is lower than "0.6", then it is determined that the final scene reliability is low.

In the present embodiment, the correction γ curve in FIG. 10A is selected for a nightscape scene while the correction γ curve in FIG. 10B is selected for an underexposure scene, however, a γ curve different from these in the present embodiment may be selected. For example, if the scene determination result is an underexposure scene, the correction processing is performed such that the entire image becomes brighter. For example, the correction processing may be performed with the γ curve 1003 in FIG. 10C.

Further, in the present embodiment, the γ value of the γ curve is determined based on the average value of luminance (Y) as the brightness component, however, the determination of the γ value is not limited to the luminance (Y) average value as long as any of the calculated feature amounts of the image data is used. For example, the γ value may be determined based on the color difference (Cb) as the color variation component, as a feature amount of the input image data.

Further, in the present embodiment, the threshold value is set to "0.6", however, the present invention is not limited to this value. For example, the threshold value may be "0.5", "0.7" or the like.

Further, in the present embodiment, the correction γ curve is changed in correspondence with the final scene reliability, however, it may be utilized in processing to change the amount of correction. For example, the γ value of the γ curve may be changed in correspondence with the final scene reliability. Further, in the present embodiment, the gradation correction processing as shown in FIGS. 10A to 10C is performed, however, any well-known correction procession may be performed as long as the gradation correction is performed by using at least scene determination result. For example, if the scene determination result is a nightscape scene, correction to raise the saturation of a high-luminance density value may be performed. Further, in the present embodiment, the correction processing is performed on image data to be print-outputted by using scene determination result, however, the present invention is not limited to this correction processing as long as an apparatus or method utilizing scene determination result is used. For example, it may be arranged such that upon photographing with a digital camera, the scene is determined and the scene determination result is utilized for various controls such as controls of exposure amount, a photographing mode and the like. Further, for example, it may be arranged such that upon image layout and display, the scene determination is performed and the scene determination result is utilized in processing for classification and layout of image data by scene.

As described above, according to the present embodiment, the final scene reliability (first scene reliability) is calculated from the reliability of a determined scene (scene reliability) and the weight of the determined scene (representative point reliability), thereby more accurate scene reliability can be obtained. Further, by obtaining more accurate scene reliability, appropriate correction processing can be performed in correspondence with the reliability.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (for example, computer-readable medium)

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-123543, filed May 21, 2009, which is hereby incorporated by reference herein in its entirety.

What is claimed is:

1. An image processing apparatus comprising:
a feature amount acquisition unit that acquires a first feature amount from image data;
a scene determination unit that determines a scene of the image data based on the first feature amount; and
a correction unit that corrects the image data, based on the scene determined by the scene determination unit, the first feature amount acquired by the feature amount acquisition unit, a second feature amount corresponding to the scene determined by the scene determination unit and a weight corresponding to the second feature amount.

2. The image processing apparatus according to claim 1, wherein the scene determination unit determines a scene of the image data based on a coordinate indicating a brightness component and a color difference component of the image data and coordinates indicating a brightness component and a color difference component of a previously set scene in a feature amount space including at least a brightness component and a color difference component.

3. The image processing apparatus according to claim 1, wherein the scene determination unit calculates distances between a coordinate indicating a brightness component and a color difference component of the image data and coordinates indicating a brightness component and a color difference component of a previously set scene in a feature amount space including at least a brightness component and a color difference component, and determines a scene of the image data as a scene corresponding to a feature amount indicated by a coordinate having the shortest distance from the coordinate indicating a brightness component and a color difference component of the image data, among the calculated distances.

4. The image processing apparatus according to claim 1, further comprising a calculation unit that calculates a scene reliability of the scene determined by the scene determination unit based on a distance between feature amount of the image data and feature amount of the scene determined by the scene determination unit in a feature amount space including at least a brightness component and a color difference component, and calculates a final scene reliability of the scene based on the scene reliability and the weight.

5. The image processing apparatus according to claim 4, wherein the calculation unit calculates the scene reliability of the scene based on a ratio of a distance of a feature amount having the shortest distance and a distance of a feature amount having the secondary shortest distance.

6. The image processing apparatus according to claim 1, wherein the correction unit corrects the image data using a different correction amount based on whether the scene determination unit determines a nightscape scene or an underexposure scene of the image data.

7. The image processing apparatus according to claim 4, wherein the correction unit obtains the correction amount based on the scene determined by the scene determination unit, the final scene reliability and the weight, and corrects brightness of the image data using the obtained correction amount.

8. The image processing apparatus according to claim 1, wherein the first feature amount includes a brightness component and a color difference component.

9. The image processing apparatus according to claim 1, wherein the second feature amount includes a brightness component and a color difference component.

10. A control method for controlling an image processing apparatus, comprising:
   a feature amount acquisition step of acquiring a first feature amount from image data;
   a scene determination step of determining a scene of the image data based on the first feature amount; and
   a correction processing step of correcting the image data, based on the scene determined in the scene determination step, the first feature amount acquired in the acquisition step, a second feature amount corresponding to the scene determined in the scene determination step and a weight corresponding to the second feature amount.

11. A non-transitory computer-readable storage medium on which is retrievably stored computer-executable process steps for causing a computer to execute the method according to claim 10.

12. An image processing apparatus comprising:
   a feature amount acquisition unit that acquires a feature amount from image data,
   a determination unit that compares the acquired feature amount with a first feature amount corresponding to a first weight and a second feature amount corresponding to a second weight, and determines a scene of the image data based on a comparison result; and
   a correction unit that corrects the image data based on the scene determined by the determination unit and the first weight.

13. The image processing apparatus according to claim 12, wherein the feature amount includes a brightness component and a color difference component, and the determination unit determines the scene of the image data in a feature amount space including at least a brightness component and a color difference component.

14. The image processing apparatus according to claim 12, wherein the feature amount includes a brightness component and a color difference component, and the determination unit calculates a distance between a coordinate indicating brightness component and color difference component of the image data and a coordinate indicating the first feature amount, calculates distance between a coordinate indicating a brightness component and a color difference component of the image data and a coordinate indicating the second feature amount, and determines a scene of the image data as a scene corresponding to a feature amount indicated by a coordinate having the most short distance from the coordinate indicating a brightness component and a color difference component of the image data, among the calculated distances.

15. The image processing apparatus according to claim 14, wherein the first feature amount is a feature amount indicated by a coordinate having the shortest distance from a coordinate indicating the brightness component and the color difference component of the image data.

16. The image processing apparatus according to claim 14, wherein the correction unit further corrects the image data based on the first feature amount and the second feature amount.

17. A method of controlling an image processing apparatus, the method comprising:
   acquiring a feature amount from image data;
   comparing the acquired feature amount with a first feature amount corresponding to a first weight and a second feature amount corresponding to a second weight;
   determining a scene of the image data based on a comparison result; and
   correcting the image data based on the scene determined in the determining step and the first weight.

18. A non-transitory computer readable storage medium storing a program for causing a computer to execute a method of controlling an image processing apparatus, the method comprising:
   acquiring a feature amount from image data;
   comparing the acquired feature amount with a first feature amount corresponding to a first weight and a second feature amount corresponding to a second weight;
   determining a scene of the image data based on a comparison result; and
   correcting the image data based on the scene determined in the determining step and the first weight.

* * * * *